United States Patent
Carralero et al.

(10) Patent No.: US 10,126,158 B2
(45) Date of Patent: Nov. 13, 2018

(54) SYSTEMS AND METHODS FOR DETERMINING A FUEL LEVEL MEASUREMENT OF A FUEL TANK USING OPTICAL SENSOR

(71) Applicant: The Boeing Company, Chicago, IL (US)

(72) Inventors: Michael A. Carralero, Huntington Beach, CA (US); Kawthar Kasim, Long Beach, CA (US); Paul Scott Truzzi, Kent, WA (US)

(73) Assignee: The Boeing Company, Chicago, IL (US)

( * ) Notice: Subject to any disclaimer, the term of this patent is extended or adjusted under 35 U.S.C. 154(b) by 137 days.

(21) Appl. No.: 15/243,062

(22) Filed: Aug. 22, 2016

(65) Prior Publication Data

US 2018/0052029 A1 Feb. 22, 2018

(51) Int. Cl.
| | |
|---|---|
| *B64D 37/02* | (2006.01) |
| *G01F 23/14* | (2006.01) |
| *G01F 23/18* | (2006.01) |
| *G01F 23/292* | (2006.01) |

(52) U.S. Cl.
CPC .............. *G01F 23/14* (2013.01); *B64D 37/02* (2013.01); *G01F 23/18* (2013.01); *G01F 23/292* (2013.01)

(58) Field of Classification Search
CPC .......... B64D 37/02; B64D 37/04; G01F 23/14
USPC ...................... 250/227.11, 227.14; 385/9, 11
See application file for complete search history.

(56) References Cited

U.S. PATENT DOCUMENTS

| | | | |
|---|---|---|---|
| 5,026,984 A | 6/1991 | Gerdt | |
| 2016/0231231 A1* | 8/2016 | Chan | ........................ G01K 1/00 |

FOREIGN PATENT DOCUMENTS

| | | |
|---|---|---|
| GB | 2503466 | 1/2014 |
| WO | WO 2014/076455 | 5/2014 |

OTHER PUBLICATIONS

Extended European Search Report prepared by the European Patent Office in Application No. 17182425.3 dated Dec. 15, 2017.

* cited by examiner

*Primary Examiner* — Kevin Pyo
(74) *Attorney, Agent, or Firm* — McDonnell Boehnen Hulbert & Berghoff LLP

(57) ABSTRACT

An example fuel quantity indicating system includes a fuel tank, optical sensors mounted inside the fuel tank that each include a sensor chip and a diaphragm that deflects when ambient pressure differs from a reference pressure of the sensor chip, an optical fiber bundle that has an optical fiber connected to each of the optical sensors for guiding light to each of the optical sensors, and a processor connected to the optical fiber bundle for receiving outputs of the optical sensors indicative of respective pressures, and for determining a fuel level measurement of the fuel tank based on the outputs of the optical sensors.

20 Claims, 5 Drawing Sheets

SYSTEMS AND METHODS FOR DETERMINING A FUEL LEVEL MEASUREMENT OF A FUEL TANK USING OPTICAL SENSOR

FIELD

The present disclosure relates generally to systems and methods for determining a fuel level measurement of a fuel tank, and more particularly to, determining a fuel level measurement of the fuel tank based on the outputs of optical sensors mounted inside the fuel tank.

BACKGROUND

Many airplanes today use capacitive based fuel quantity indicating systems, in which fuel probes include two concentric tubes that act as capacitors. Metal wires for the probes are inserted into a fuel tank, and redundant supports are provided for the wiring, which increases an overall weight of the system, and increases a manufacturing time of the system.

In operation, as the probes are submerged in fuel in the fuel tank, a dielectric changes a capacitive output of the probes. The outputs of the probe are transmitted to a processing unit to determine a total amount of fuel in the fuel tank.

Other types of probes include ultra-sonic probes instead of capacitive probes. The ultra-sonic probes are tubes and a top of the probes send an ultra-sonic signal to a bottom of the probes. The way the signal propagates through the medium, whether fuel or air, in combination with whether the signal contacts a fuel surface determines a fuel height in the fuel tank. Again, this type of quantity indicating systems requires metal wires in the fuel tank and redundant supports, which increases a system weight and manufacturing time.

What is needed is a fuel indicating system that provides an electromagnetic interference (EMI) safe system requiring no metal in the fuel tank, which eliminates metal wires in the fuel tank and a need for redundant supports as well as decreases system weight and manufacturing time.

SUMMARY

In one example, a system is described that includes a fuel tank, and a plurality of optical sensors mounted inside the fuel tank. The plurality of optical sensors each include a sensor chip and a diaphragm that deflects when ambient pressure differs from a reference pressure of the sensor chip. The system also includes an optical fiber bundle having an optical fiber connected to each of the plurality of optical sensors for guiding light to each of the plurality of optical sensors, and one or more processors connected to the optical fiber bundle for receiving outputs of the plurality of optical sensors indicative of respective pressures, and for determining a fuel level measurement of the fuel tank based on the outputs of the plurality of optical sensors.

In another example, an aircraft is described that includes a fuel tank positioned in one or more of a wing and a fuselage of the aircraft, and a plurality of optical sensors mounted inside the fuel tank. The plurality of optical sensors each include a sensor chip and a diaphragm that deflects when ambient pressure differs from a reference pressure of the sensor chip. The aircraft also includes an optical fiber bundle having an optical fiber connected to each of the plurality of optical sensors for guiding light to each of the plurality of optical sensors, and one or more processors connected to the optical fiber bundle for receiving outputs of the plurality of optical sensors indicative of respective pressures, and for determining a fuel level measurement of the fuel tank based on the outputs of the plurality of optical sensors and accounting for any deflections of the wing and flight dynamics.

In another example, a method for determining a fuel level measurement of a fuel tank is described. The method includes receiving, from a plurality of optical sensors mounted inside a fuel tank, outputs indicative of respective pressures, and the plurality of optical sensors each include a sensor chip and a diaphragm that deflects when ambient pressure differs from a reference pressure of the sensor chip. The method also includes determining, by one or more processors, a fuel level measurement of the fuel tank based on the outputs of the plurality of optical sensors.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples herein, an example fuel quantity indicating system is described that includes a fuel tank, optical sensors mounted inside the fuel tank that each include a sensor chip and a diaphragm that deflects when ambient pressure differs from a reference pressure of the sensor chip, an optical fiber bundle that has an optical fiber connected to each of the optical sensors for guiding light to each of the optical sensors, and a processor connected to the optical fiber bundle for receiving outputs of the optical sensors indicative of respective pressures, and for determining a fuel level measurement of the fuel tank based on the outputs of the optical sensors.

Figure 1:
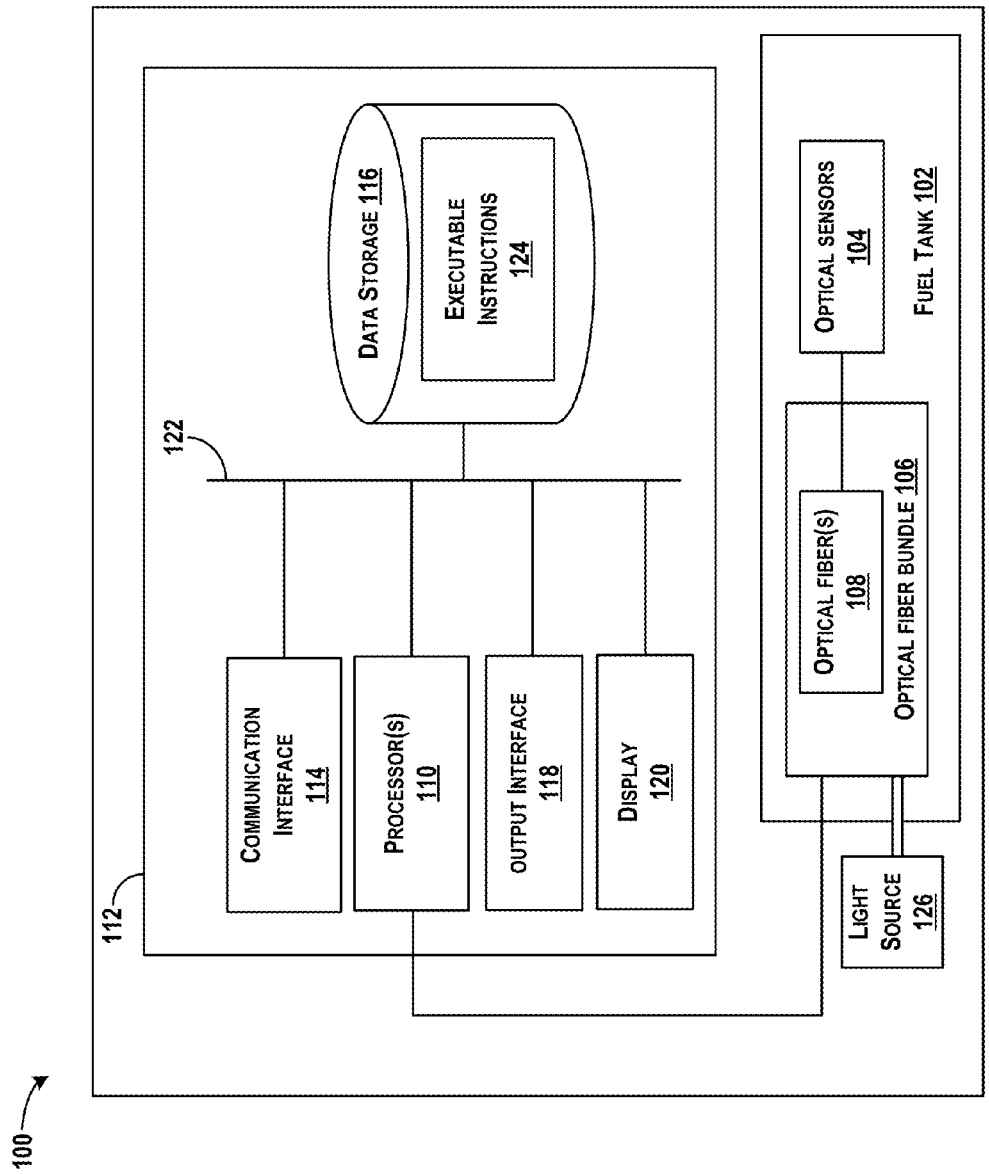
FIG. 1 is a block diagram of a system, according to an example embodiment.

Referring now to FIG. 1, a block diagram of a system 100 is illustrated, according to an example embodiment. The system 100 includes a fuel tank 102, a plurality of optical sensors 104 mounted inside the fuel tank 102, an optical fiber bundle 106 that has optical fiber(s) 108 connected to each of the optical sensors 104 for guiding light to each of the optical sensors 104, and one or more processor(s) 110 connected to the optical fiber bundle 106 for receiving outputs of the optical sensors 104 indicative of respective pressures, and for determining a fuel level measurement of the fuel tank 102 based on the outputs of the optical sensors 104.

The fuel tank 102 can be a single fuel tank with a single section, a single fuel tank with multiple sections, or multiple fuel tanks as well.

The optical sensors 104 each include a sensor chip 140 and a diaphragm 142 that deflects when ambient pressure differs from a reference pressure of the sensor chip, as described in more detail with reference to FIG. 4 below. In one example, the optical sensors 104 include dynamic photonic crystal optical pressure sensors.

The optical fiber bundle 106 includes the optical fiber(s) 108 that are used to carry light. The optical fiber(s) 108 may be individually coated with plastic layers and contained in a protective tube. Different types of cable can be used, and arranged together within the optical fiber bundle 106. The optical fiber bundle 106 is arranged to enter the fuel tank 102 at one location and is positioned inside the fuel tank 102 and terminates with respective optical fiber(s) 108 at respective positions of the optical sensors 104. Although FIG. 1 shows the entire optical fiber bundle 106 positioned inside the fuel tank 102, a portion of the optical fiber bundle 106 may be positioned outside the fuel tank 102 to connect to the processor(s) 110.

The system 100 is also shown to include a computing device 112 that has the processor(s) 110, and also a communication interface 114, data storage 116, an output interface 118, and a display 120 each connected to a communication bus 122. The computing device 112 may also include hardware to enable communication within the computing device 112 and between the computing device 112 and other devices (not shown). The hardware may include transmitters, receivers, and antennas, for example.

The communication interface 114 may be a wireless interface and/or one or more wireline interfaces that allow for both short-range communication and long-range communication to one or more networks or to one or more remote devices. Such wireless interfaces may provide for communication under one or more wireless communication protocols, such as Very High Frequency (VHF) Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 114 may be configured to receive input data from one or more devices, and may also be configured to send output data to other devices.

The data storage 116 may include or take the form of one or more computer-readable storage media that can be read or accessed by the processor(s) 110. The computer-readable storage media can include volatile and/or non-volatile storage components, such as optical, magnetic, organic or other memory or disc storage, which can be integrated in whole or in part with the processor(s) 110. The data storage 116 is considered non-transitory computer readable media. In some embodiments, the data storage 116 can be implemented using a single physical device (e.g., one optical, magnetic, organic or other memory or disc storage unit), while in other embodiments, the data storage 116 can be implemented using two or more physical devices.

The data storage 116 thus is a non-transitory computer readable storage medium, and executable instructions 124 are stored thereon. The instructions 124 include computer executable code. When the instructions 124 are executed by the processor(s) 110, the processor(s) 110 are caused to perform functions. Such functions include receiving outputs indicative of respective pressures from the optical sensors 104, and determining a fuel level measurement of the fuel tank 102 based on the outputs of the optical sensors 104.

The processor(s) 110 may be a general-purpose processor or a special purpose processor (e.g., digital signal processors, application specific integrated circuits, etc.). The processor(s) 110 may receive inputs from the optical fiber bundle 106, and process the inputs to generate outputs that are stored in the data storage 116 and output to the display 120. The processor(s) 110 can be configured to execute the executable instructions 124 (e.g., computer-readable program instructions) that are stored in the data storage 116 and are executable to provide the functionality of the system 100 described herein.

The output interface 118 outputs information to the display 120 or to other components as well. Thus, the output interface 118 may be similar to the communication interface 114 and can be a wireless interface (e.g., transmitter) or a wired interface as well.

The system 100 also includes a light source 126 coupled or connected to the optical fiber bundle 106 for generating the light that is carried by the optical fiber(s) 108. The light source 126 can include a single light emitting diode (LED), or multiple LEDs, for example. The light source 126 can be connected to the optical fiber bundle 106 outside of the fuel tank 102.

The system 100 may be included within a number of different vehicles, including aircraft, automobiles, or boats, for example.

Figure 2:
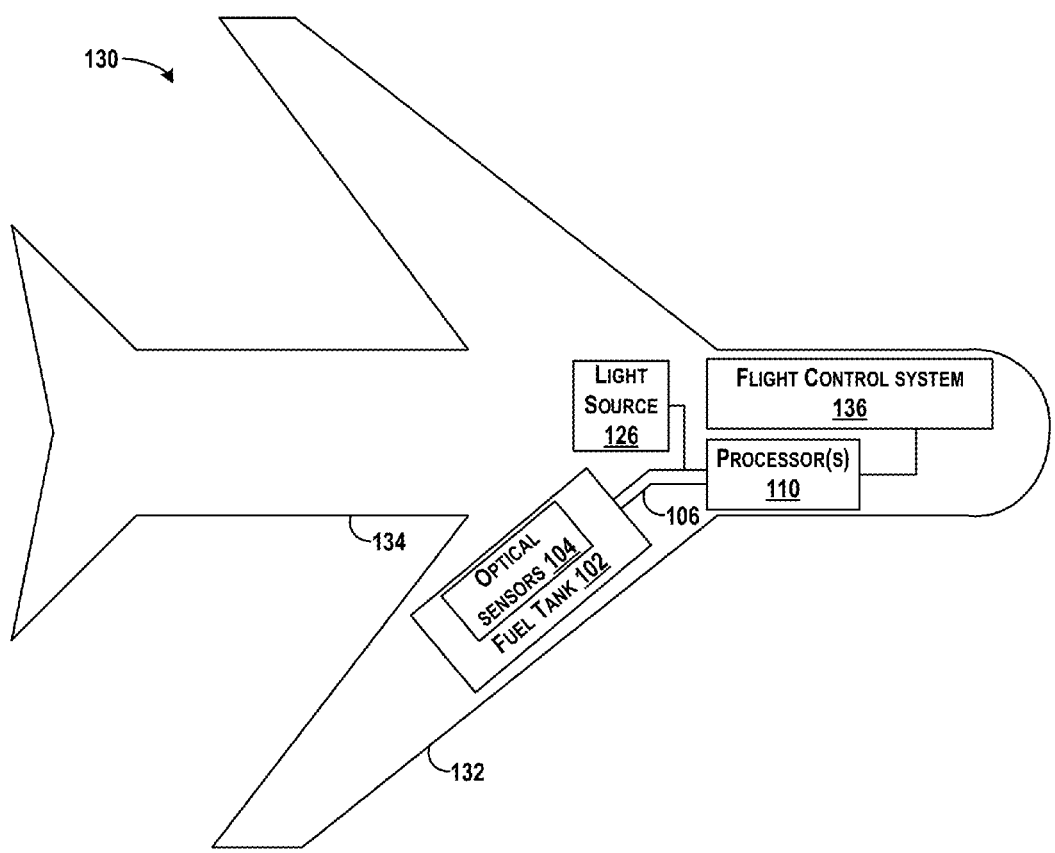
FIG. 2 is a block diagram of an example aircraft, according to an example embodiment.

FIG. 2 is a block diagram of an example aircraft 130, according to an example embodiment. The aircraft 130 may include the system 100, although only a portion of the system 100 is shown in FIG. 2 for simplicity. The aircraft 130 includes the fuel tank 102 positioned in one or more of a wing 132 and a fuselage 134 of the aircraft 100. In some examples, the fuel tank 102 can be positioned entirely within the wing 132. In other examples, the fuel tank 102 can be positioned entirely within the fuselage 134. In still other examples, as shown in FIG. 2, the fuel tank 102 can be positioned to have a portion within the wing 132 and a portion within the fuselage 134.

Figure 3:
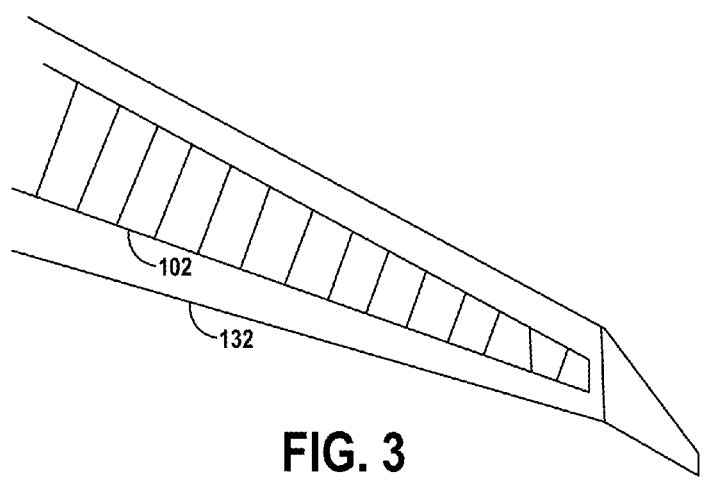
FIG. 3 illustrates an example of the wing including the fuel tank, according to an example embodiment.

FIG. 3 illustrates an example of the wing 132 including the fuel tank 102, according to an example embodiment. In FIG. 3, the fuel tank 102 is shown to be positioned in the wing 132 and to extend to a tip of the wing 132. The fuel tank 102 is also shown to be divided into multiple sections. Each section may include at least one optical sensor 104, for example. In other examples, the fuel tank 102 does not include multiple sections.

Referring back to FIG. 2, other components of the system 100, such as the light source 126 and the processor(s) 110 may be positioned elsewhere in the aircraft 130, or adjacent to the fuel tank 102 as well The processor(s) are connected to the optical fiber bundle 106 for receiving outputs of the optical sensors 104 indicative of respective pressures, and for determining a fuel level measurement of the fuel tank 102 based on the outputs of the optical sensors 104 and accounting for any deflections of the wing 132 and flight dynamics. In this regard, the aircraft 130 includes a flight control system 136 that can determine flight dynamics of the aircraft 130, such as a roll, a pitch, and a yaw, and the processor(s) 110 can receive information related to the roll, the pitch, and the yaw of the aircraft 130 and thus the fuel tank 102 from the flight control system 136.

Within examples, the processor(s) 110 can execute the executable instructions 124 stored in the data storage 116 to perform functions in real-time during flight of the aircraft 130. Such function can then occur with no or little delay to process additional data received from other sources or through manual input. The real time processing means that the processor(s) 110 perform the actions during flight of the aircraft 130. The real time processing may continually process information received from the optical sensors 104. Put another way, the real time aspect includes the processor(s) 110 determining the fuel level measurement substantially immediately upon receiving new or updated outputs from the optical sensors 104. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 4:
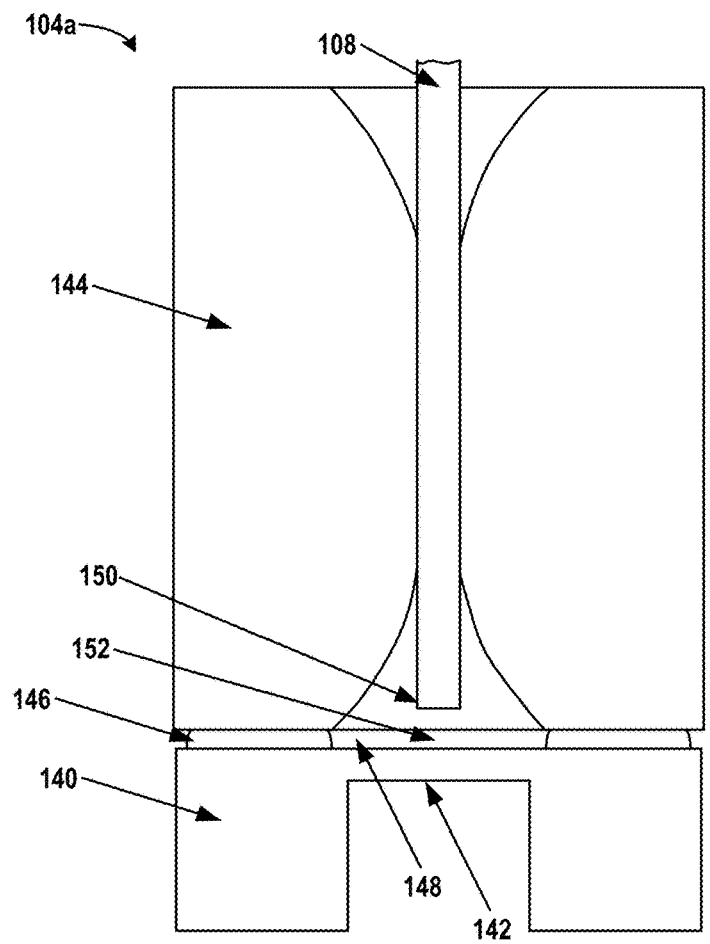
FIG. 4 illustrates an example of one of the optical sensors, according to an example embodiment.

FIG. 4 illustrates an example of one of the optical sensors 104, shown as optical sensor 104a, according to an example embodiment. The optical sensor 104a includes a sensor chip 140 and a diaphragm 142, and the diaphragm 142 may be a center portion of the sensor chip 140. The optical fiber 108 is mounted in a ferule 144 and the sensor chip 140 is mounted on a facet of the ferule 144 using an adhesive 146, so as to form a reference pressure cavity 148 that has a reference pressure. The diaphragm 142 of the sensor chip 140 defects when the ambient pressure is different from the reference pressure.

In one example, the optical sensor 104a is a micro-electro-mechanical system (MEMS) device, and changes in deflection of the diaphragm can be measured based on reflection of light.

In an example operation of the optical sensor 104a, light traveling on the optical fiber 108 down toward the diaphragm 142 is partially reflected from a fiber facet 150 (e.g., first reflector) and then partially reflected from the diaphragm 142 of the sensor chip 140 shown at arrow 152 (e.g., second reflector). These two reflected waves interfere, and if a distance between the first reflector and the second reflector is an integer of half wavelengths, the reflections of light interfere constructively and a total reflection is high (or higher than a threshold). If a distance between the first reflector and the second reflector is an integer of half wavelengths plus a quarter wavelength, then the reflections of light interfere destructively and a total reflection is low (or lower than a threshold). If a separation of the first reflector and the second reflector is between these values, then a total reflection is between a high and a low value. The reflected light is therefore a measure of a reflector separation, which is a measure of the ambient pressure. In further examples, intensity of the reflected light and a phase between the different reflections provides a pressure measurement. Lookup tables can be provided with reference to the pressure that corresponds to the reflected light.

In one example, the outputs of the optical sensors 104 include reflected light off of respective diaphragms, and the processor(s) determine a respective pressure based on the reflected light. The processor(s) 110 may refer to a lookup table to identify the measured pressure that corresponds to the amount of reflected light. In some examples, a light detector or spectrometer can be included to provide further outputs to the processor(s) 110 to provide information useful to determine the pressure.

Figure 5:
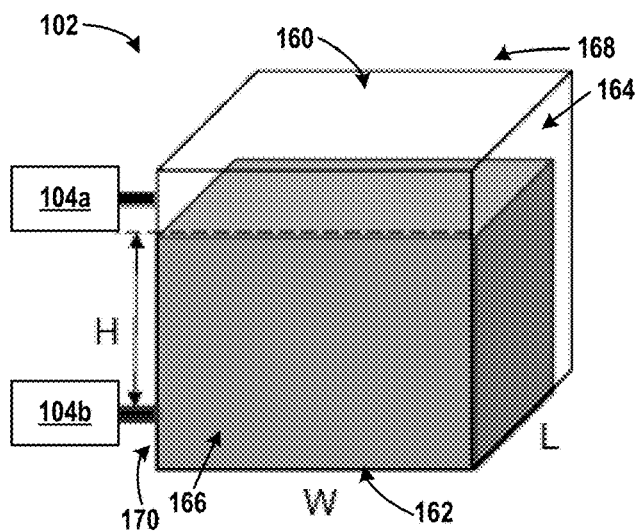
FIG. 5 illustrates a portion of the fuel tank with optical sensors, according to an example embodiment.

FIG. 5 illustrates a portion of the fuel tank 102 with optical sensors 104a-b, according to an example embodiment. In one example, the fuel tank 102 has a top 160, a bottom 162, and sides 164, 166, 168, and 170, and respective optical sensors may be positioned on any of the sides 164-170, the top 160, and the bottom 162, depending on a size and configuration of the fuel tank 102. In another example, as shown in FIG. 5, both of the optical sensors 104a-b are positioned on the side 170, with the optical sensor 104a positioned on the side 170 near the top 160, and the optical sensor 104b positioned on the side 170 near the bottom 162. Many other different arrangements of optical sensors on the fuel tank 102 can be used. The optical sensors 104a-b can provide useful information for determination of the fuel level measurement of the fuel tank 102.

The optical sensors 104a-b are shown exterior to the fuel tank 102 in FIG. 5, however, at least the respective diaphragm 142 of each of the optical sensors 104a-b is interior to the fuel tank 102 so that fuel or air/gas contacts the diaphragm 142. In the example shown in FIG. 5, air/gas contacts the optical sensor 104a and fuel contacts the optical sensor 104b. Also, in the example shown in FIG. 5, connectors can be placed on a surface of the fuel tank 102 to connect each of the optical sensor 104a-b to the fuel tank 102. The connector can be an insert to insert the optical sensors 104a-b into the fuel tank 102. Thus, the optical fiber bundle 106 can connect to the connector and penetrate the fuel tank 102 in one location to run a bundle harness inside the fuel tank 102 and terminate at each optical sensor location. The optical sensors 104 can be positioned inside and at the bottom 162 of the fuel tank 102 to obtain pressure readings.

In other examples, the optical fiber bundle 106 and the optical sensors 104 are positioned entirely into the fuel tank 102, and can be attached to an interior surface of the fuel tank 102 with an adhesive.

To determine a fuel level measurement of fuel in the fuel tank, a volume of the fuel is calculated and density of fuel utilized. To determine the volume, a height of fuel in the fuel tank is first determined. Outputs of the optical sensors 104a-b can be used to determine the height. For example, the diaphragm 142 of the optical sensors 104a-b deflects when ambient pressure differs from a reference pressure of the sensor chip 140, and this will occur when the fuel is at or above a level of the optical sensors 104a-b so as to contact the diaphragm 142. Thus, when the optical sensors 104a-b are submerged in fuel or are in air during flight in the fuel tank 102, a pressure delta is apparent and the outputs of the optical sensors 104a-b change due to deflection of the diaphragm 142.

The height, H, as shown in FIG. 5 can be calculated for a level fuel tank (i.e., not tilted) as shown below in Equation (1).

$$H = \frac{p_2 - p_1}{\gamma_{fuel}}, \quad \text{Equation (1)}$$

where $\gamma_{fuel}$ is the specific gravity (e.g., density*gravity) of the fuel, and $p_1$ and $p_2$ are measured pressures using the optical sensors 104a-b. The fuel level measurement includes a volume of fuel in the fuel tank 102, and the volume of fuel can be determined by H×W×L, where H is determined from Equation (1) above, W is a width of the fuel tank 102 and L is a length of the fuel tank 102, as shown in FIG. 5. The height can be determined using Equation (1) in examples in which the optical sensor 104b is positioned at a bottom of the fuel tank 102.

Thus, within examples, the respective positions of the optical sensors 104a-b inside the fuel tank 102 are represented by the height (H) above the bottom 162 of the fuel tank 102, and the processor(s) 110 determines the height (H) of fuel in the fuel tank 102 based on a ratio of a difference of pressures indicated by a first optical sensor 104a and a second optical sensor 104b and a specific gravity of fuel included in the fuel tank 102 when the tank is level.

In one example, the processor(s) 110 determine the specific gravity of fuel included in the fuel tank 102 based on a temperature inside the fuel tank 102 and reference to a density/temperature empirical lookup table. Fuel density is not constant, and is based on a function of temperature. For instance, a type of fuel in the fuel tank 102 is known, and the type of fuel will have a known density at a specific temperature. Temperature sensors can be included in the fuel tank 102 and connected to the processor(s) 110, and then an empirical lookup table can be used to determine the density for the known type of fuel given the temperature of the fuel. In an application of the fuel tank 102 installed on the aircraft 130, when the aircraft 130 is on the ground, a density/temperature curve can be selected, and then when the aircraft 130 is in flight, readings from the temperature sensors can be used in the lookup table to determine the density.

In another example, to determine a density and thus a specific gravity of the fuel, the processor(s) 110 can determine the specific gravity of fuel included in the fuel tank based on (i) a difference between outputs of the two optical sensors 104a-b for determination of a difference in weight of fuel, and (ii) a known distance between the two optical sensors 104a-b sensors for calculation of a weight per unit volume of the fuel.

In still a further example, the optical sensors 104a-b can be configured to further provide outputs for determination of a temperature inside the fuel tank 102. For instance, by measuring a phase difference between the two reflected beams of light, temperature can be determined again by reference to a lookup table relating phase differences to temperature.

In the example application of the fuel tank 102 installed in the wing 132 of the aircraft 130, during flight, the wing 132 deflects due to wind turbulence and other flight conditions. As a length of the wing 132 increases, an amount of deflection also increases. The deflection of the wing 132 can cause a change in the volume calculation above. Using the optical sensors 104 enables the processor(s) 110 to account for wing deflection and flight dynamics in the calculation of the fuel level measurement based on the measured pressure.

Figure 6:
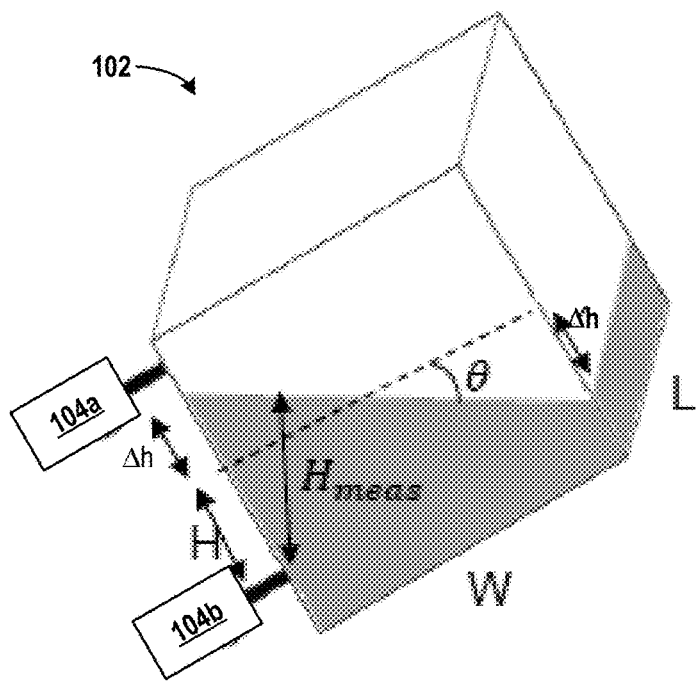
FIG. 6 illustrates a portion of the fuel tank with the optical sensors in which the fuel tank is tilted due to flying conditions of the aircraft and no deformation is seen in the fuel tank, according to an example embodiment.

FIG. 6 illustrates a portion of the fuel tank 102 with the optical sensors 104a-b in which the fuel tank 102 is tilted with a roll angle θ due to flying conditions of the aircraft 130 and no deformation is seen in the fuel tank 102, according to an example embodiment. The fuel tank 102 thus is turning at a roll angle, and fluid is dispersed in the fuel tank 102. Here, the height (H) can be calculated as shown below using Equations (2) and (3).

$$H_{meas} = \frac{p_2 - p_1}{\gamma_{fuel}}, \quad \text{Equation (2)}$$

$$H = \frac{H_{meas}}{\cos\theta} \pm \frac{W}{2}\tan\theta, \quad \text{Equation (3)}$$

The angle (θ) can be determined from the roll of the fuel tank 102 or aircraft 130, and is provided by the flight control system 136. Thus, the flight control system 136 may output the angle (θ) to the processor(s) 110. Once the height (H) is determined using Equation (3), then the volume calculation can be performed as described above. A similar calculation would be made for the aircraft with yaw and pitch inclinations.

Thus, within one example, the processor(s) 110 further receive information related to one or more of a roll, a pitch, and a yaw of the fuel tank 102, and determine the height (H) of fuel in the fuel tank 102 based on (i) a ratio of a difference of pressures indicated by a first optical sensor 104a and a second optical sensor 104b and a specific gravity of fuel included in the fuel tank 102 and (ii) the angle (θ) of tilt of the fuel tank 102 determined from the information related to one or more of the roll, the pitch, and the yaw of the fuel tank 102.

Figure 7:
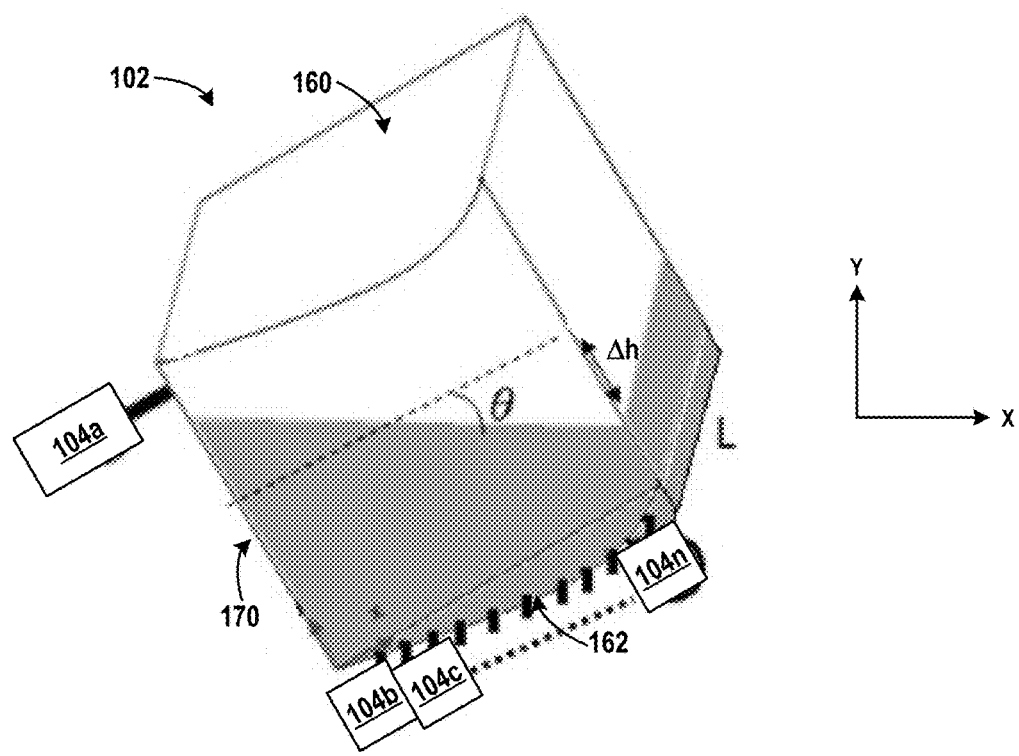
FIG. 7 illustrates a portion of the fuel tank with the optical sensors in which the fuel tank is tilted due to flying conditions of the aircraft and a deformation is seen in the top and the bottom of the fuel tank, according to an example embodiment.

FIG. 7 illustrates a portion of the fuel tank 102 with the optical sensors 104a-n in which the fuel tank 102 is tilted due to flying conditions of the aircraft 130 and a deformation is seen in the top 160 and the bottom 162 of the fuel tank 102, according to an example embodiment. Here, the volume of fuel in the fuel tank 102 can be calculated as shown below using Equation (4).

$$V_{total} = \sum_{i=1}^{N} \left(\frac{1}{2}\Delta h \Delta x L + h_i \Delta x L\right), \quad \text{Equation (4)}$$

$$\text{where } h_i(x) = \frac{p_i(x) - p_1}{\gamma_{fuel}} \frac{1}{\cos\theta},$$

$$\Delta x = x_i - x_{i-1}, \text{ and } \Delta h = h_i - h_{i-1}.$$

Each of the optical sensors 104a-n, represented as $p_i(x)$ in the Equations above, provides a pressure output to calculate the height $h_i(x)$ at that x location. Due to a tilt of the aircraft 130 and the fuel tank 102, take cos θ, and discretize and sum volumes of fuel using the measured pressure of each segment. Furthermore, due to the deformation in the top 160 and the bottom 162, the variations of volume of the fuel tank 102 can be taken into account using outputs from all of the optical sensors 104a-n.

Thus, within an example, the processor(s) 110 determine the height (H) of fuel in the fuel tank 102 at a position of each of the optical sensors 104a-n based on the respective pressures and on an angle of tilt of the fuel tank 102, and determine the fuel level measurement of the fuel tank 102 based on a sum of a volume of fuel as determined due to the height (H) for each of the optical sensors 104a-n.

Although the example shown in FIG. 7 illustrates the optical sensor 104a positioned on the side 170 of the fuel tank and the optical sensors 104b-n positioned on the bottom 162 of the fuel tank 102, many other arrangements of optical sensors on or in the fuel tank 102 can be provided. When the fuel tank 102 is installed in the wing 132 of the aircraft 130, as the wing 132 deflects more, and is more flexible, use of more optical sensors can provide higher accuracy in the fuel level measurement. In contrast, when the wing 132 is a rigid wing 132, less optical sensors may be needed for high accuracy of the fuel level measurement. Similarly, shorter wings may use less optical sensors than longer wings. Any number of optical sensors may be used depending on a size and shape of the wing.

Figure 8:
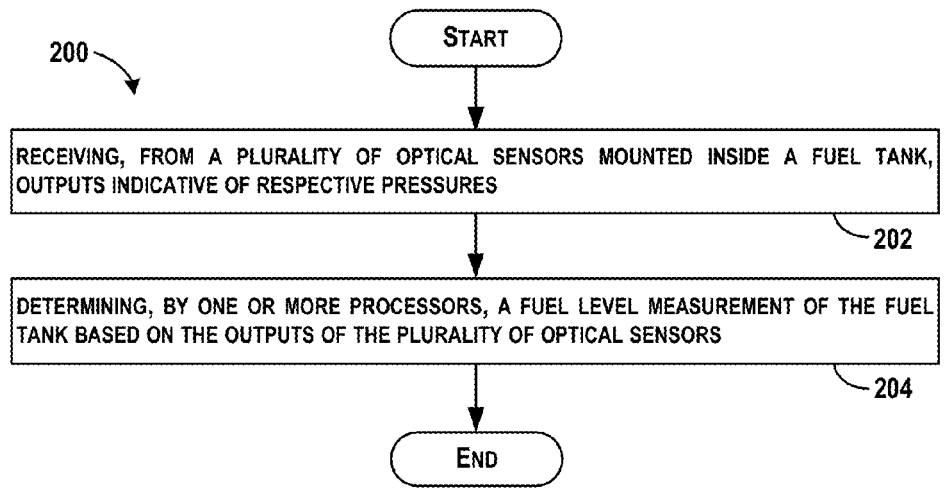
FIG. 8 shows a flowchart of an example method for determining a fuel level measurement of the fuel tank, according to an example embodiment.

FIG. 8 shows a flowchart of an example method 200 for determining a fuel level measurement of the fuel tank 102, according to an example embodiment. Method 200 shown in FIG. 8 presents an embodiment of a method that could be used with the system 100 shown in FIG. 1 and the aircraft 130 shown in FIG. 2, for example. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202 and 204. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving, from a plurality of optical sensors 104 mounted inside the fuel tank 102, outputs indicative of respective pressures. The plurality of optical sensors 104 each include the sensor chip 140 and the diaphragm 142 that deflects when ambient pressure differs from a reference pressure of the sensor chip 140.

In some examples, additional inputs may be received including temperature sensor readings and flight control readings so as to calculate the fuel level measurement of the fuel tank 102 in instances in which the fuel tank 102 is not level.

At block 204, the method 200 includes determining, by the processor(S) 110, a fuel level measurement of the fuel tank 102 based on the outputs of the plurality of optical sensors 104. The determination of the fuel level measurement may be made using Equations (1)-(4) above.

Figure 9:
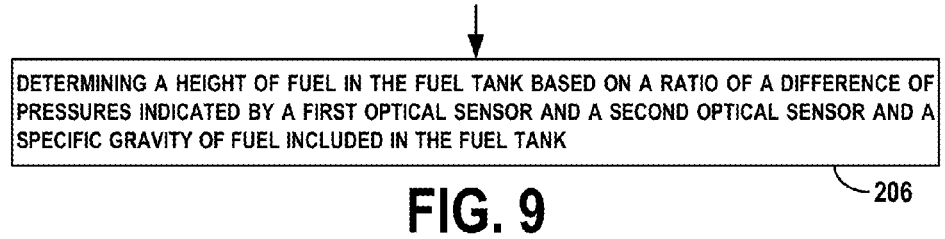
FIG. 9 shows a flowchart of an example method for use with the method, according to an example embodiment.

FIG. 9 shows a flowchart of an example method for use with the method 200, according to an example embodiment. At block 206, functions include determining a height of fuel in the fuel tank 102 based on a ratio of a difference of pressures indicated by the first optical sensor 104a and the second optical sensor 104b and a specific gravity of fuel included in the fuel tank 102. In this example, the respective positions of the plurality of optical sensors 104 inside the fuel tank 102 are represented by a height above the bottom 162 of the fuel tank 102.

Figure 10:
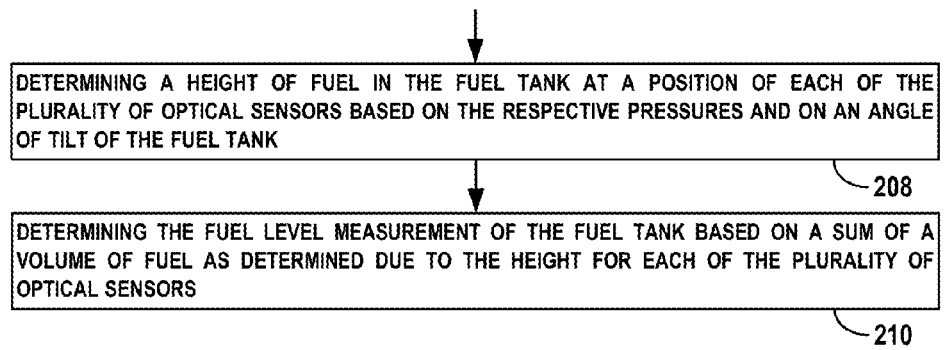
FIG. 10 shows a flowchart of an example method for use with the method, according to an example embodiment.

FIG. 10 shows a flowchart of an example method for use with the method 200, according to an example embodiment. At block 208, functions include determining a height of fuel in the fuel tank 102 at a position of each of the plurality of optical sensors 104 based on the respective pressures and on an angle of tilt of the fuel tank 102, and at block 210, functions include determining the fuel level measurement of the fuel tank 102 based on a sum of a volume of fuel as determined due to the height for each of the plurality of optical sensors 104.

The system 100 described can use the optical sensors 104 to replace current fuels quantity indication system (FQIS) with new intrinsically EMI safe system that requires no metal in the fuel tank 102. For example, using the optical fiber bundle 106, metal wires are not needed in the fuel tank 102 and there is no need for redundant supports. It is desired to eliminate use of copper wiring in the fuel tank 102, and use of the optical fiber bundle 106 can do so. This decreases system weight and manufacturing time.

The example applications of photonic crystal pressure sensors for aircraft fuel level measurement enable the fuel level measurement to be calculated when experiencing wing deflections and flight dynamics. Example benefits of use of the system 100 include high accuracy pressure measurements that satisfy no sources of ignition requirement as it uses a low power light beam completely enclosed, no interaction with fuel, and no sources of ignition in the fuel tank 102. The system 100 has a potential for a large reduction in weight from existing fuel gauging systems since the optical sensors 104 are lightweight as compared to existing capacitive sensors.

The system 100 can be used in areas such as fuel tanks, where the environment due to conditions such as heat or safety concerns can lead to difficult engineering challenges.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a fuel tank;
   a plurality of optical sensors mounted inside the fuel tank, wherein the plurality of optical sensors each include a sensor chip and a diaphragm that deflects when ambient pressure differs from a reference pressure of the sensor chip, wherein respective positions of the plurality of optical sensors inside the fuel tank are represented by a height above a bottom of the fuel tank;
   an optical fiber bundle having an optical fiber connected to each of the plurality of optical sensors for guiding light to each of the plurality of optical sensors; and
   one or more processors connected to the optical fiber bundle for receiving outputs of the plurality of optical sensors indicative of respective pressures, and for determining a height of fuel in the fuel tank based on a ratio of a difference of pressures indicated by outputs of a first optical sensor and a second optical sensor and a specific gravity of fuel included in the fuel tank, wherein the one or more processors further determine a fuel level measurement of the fuel tank based on the height of fuel in the fuel tank.

2. The system of claim 1, wherein the fuel tank has a top, the bottom, and sides, and wherein respective sensors of the plurality of optical sensors are at least positioned on a side and the bottom.

3. The system of claim 1, wherein as the plurality of optical sensors are submerged in fuel in the fuel tank, the outputs of the plurality of optical sensors change.

4. The system of claim 1, wherein the optical fiber bundle enters the fuel tank at one location and is positioned inside the fuel tank and terminates with respective optical fibers at respective positions of the plurality of optical sensors.

5. The system of claim 1, wherein the outputs of the plurality of optical sensors include reflected light off of respective diaphragms, and wherein the one or more processors determine a respective pressure based on the reflected light.

6. The system of claim 1, wherein the fuel level measurement includes a volume of fuel in the fuel tank.

7. The system of claim 1, wherein the plurality of optical sensors further provide outputs for determination of a temperature inside the fuel tank.

8. The system of claim 1, further comprising a light source coupled to the optical fiber bundle for generating the light.

9. The system of claim 1, wherein the one or more processors determine the specific gravity of fuel included in the fuel tank based on a temperature inside the fuel tank and reference to a density/temperature graph.

10. The system of claim 1, wherein the one or more processors determine the specific gravity of fuel included in the fuel tank based on (i) a difference between outputs of two sensors of the plurality of optical sensors for determination of a difference in weight of fuel, and (ii) a known distance between the two sensors for calculation of a weight per unit volume of the fuel.

11. The system of claim 1, wherein the one or more processors further receive information related to one or more of a roll, a pitch, and a yaw of the fuel tank, and
   wherein the one or more processors determine the height of fuel in the fuel tank based also on an angle of tilt of the fuel tank determined from the information related to one or more of the roll, the pitch, and the yaw of the fuel tank.

12. The system of claim 1, wherein the one or more processors determine the height of fuel in the fuel tank at a position of each of the plurality of optical sensors based on the respective pressures and on an angle of tilt of the fuel tank, and
   wherein the one or more processors determine the fuel level measurement of the fuel tank based on a sum of a volume of fuel as determined due to the height for each of the plurality of optical sensors.

13. An aircraft comprising:
   a fuel tank positioned in one or more of a wing and a fuselage of the aircraft;
   a plurality of optical sensors mounted inside the fuel tank, wherein the plurality of optical sensors each include a sensor chip and a diaphragm that deflects when ambient pressure differs from a reference pressure of the sensor chip, wherein respective positions of the plurality of optical sensors inside the fuel tank are represented by a height above a bottom of the fuel tank;
   an optical fiber bundle having an optical fiber connected to each of the plurality of optical sensors for guiding light to each of the plurality of optical sensors; and
   one or more processors connected to the optical fiber bundle for receiving outputs of the plurality of optical sensors indicative of respective pressures, and for determining a height of fuel in the fuel tank based on a ratio of a difference of pressures indicated by outputs of a first optical sensor and a second optical sensor and a specific gravity of fuel included in the fuel tank, wherein the one or more processors further determine a fuel level measurement of the fuel tank based on the height of fuel in the fuel tank and accounting for any deflections of the wing and flight dynamics.

14. The aircraft of claim 13, further comprising a light source coupled to the optical fiber bundle for generating the light.

15. The aircraft of claim 13, wherein the one or more processors determine the height of fuel in the fuel tank at a position of each of the plurality of optical sensors based on the respective pressures and on an angle of tilt of the fuel tank due to the flight dynamics, and
   wherein the one or more processors determine the fuel level measurement of the fuel tank based on a sum of a volume of fuel as determined due to the height for each of the plurality of optical sensors.

16. The aircraft of claim 13, wherein the one or more processors determine the specific gravity of fuel included in the fuel tank based on a temperature inside the fuel tank and reference to a density/temperature graph.

17. The aircraft of claim 13, wherein the one or more processors determine the specific gravity of fuel included in the fuel tank based on (i) a difference between outputs of two sensors of the plurality of optical sensors for determination of a difference in weight of fuel, and (ii) a known distance between the two sensors for calculation of a weight per unit volume of the fuel.

18. The aircraft of claim 13, wherein the one or more processors further receive information related to one or more of a roll, a pitch, and a yaw of the fuel tank, and
   wherein the one or more processors determine the height of fuel in the fuel tank based also on an angle of tilt of the fuel tank determined from the information related to one or more of the roll, the pitch, and the yaw of the fuel tank.

19. A method for determining a fuel level measurement of a fuel tank, comprising:
   receiving, from a plurality of optical sensors mounted inside a fuel tank, outputs indicative of respective pressures, wherein the plurality of optical sensors each include a sensor chip and a diaphragm that deflects when ambient pressure differs from a reference pressure of the sensor chip, wherein respective positions of the plurality of optical sensors inside the fuel tank are represented by a height above a bottom of the fuel tank;
   determining a height of fuel in the fuel tank based on a ratio of a difference of pressures indicated by outputs of a first optical sensor and a second optical sensor, and a specific gravity of fuel included in the fuel tank; and
   determining, by one or more processors, a fuel level measurement of the fuel tank based on the height of fuel in the fuel tank.

20. The method of claim 19, further comprising:
   determining the height of fuel in the fuel tank at a position of each of the plurality of optical sensors based on the respective pressures and on an angle of tilt of the fuel tank; and
   determining the fuel level measurement of the fuel tank based on a sum of a volume of fuel as determined due to the height for each of the plurality of optical sensors.

* * * * *